United States Patent [19]

Marshall et al.

[11] Patent Number: 5,008,572
[45] Date of Patent: Apr. 16, 1991

[54] ENCAPSULATED MOTOR WITH PRECISION BEARING REGISTRATION

[75] Inventors: James W. Marshall, Towson, Md.; David Gotchy, Roscoe; Bradley L. Uffelman, Rockford, both of Ill.; Wendell B. Leimbach, Baltimore; Albert A. Wilhelmi, Baldwin, both of Md.

[73] Assignee: Pacific Scientific Company, Rockford, Ill.

[21] Appl. No.: 491,814

[22] Filed: Mar. 30, 1990

Related U.S. Application Data

[62] Division of Ser. No. 323,507, Mar. 13, 1989, Pat. No. 4,922,604.

[51] Int. Cl.$^5$ .......................... H02K 5/15; F16C 35/00
[52] U.S. Cl. ........................................ 310/45; 310/90; 310/261
[58] Field of Search .................... 310/42, 43, 45, 71, 310/90, 261; 384/280, 281; 20/598

[56] References Cited

U.S. PATENT DOCUMENTS

| | | | |
|---|---|---|---|
| 2,916,642 | 12/1959 | Macks | 310/90 |
| 3,156,076 | 11/1964 | Origoni et al. | 29/596 |
| 3,258,624 | 6/1966 | Turk | 310/261 |
| 3,433,986 | 3/1969 | Arutunoff | 310/90 |
| 4,015,154 | 3/1977 | Tanaka et al. | 29/596 |
| 4,029,977 | 6/1977 | Chai et al. | 310/49 |
| 4,200,344 | 4/1980 | Binns et al. | 310/90 |
| 4,382,199 | 5/1983 | Isaacson | 310/90 |
| 4,538,084 | 8/1985 | Kawada et al. | 310/217 |
| 4,626,725 | 12/1986 | Kawada et al. | 310/89 |
| 4,712,028 | 12/1987 | Horber | 310/49 |
| 4,713,570 | 12/1987 | Mastromattei | 310/154 |
| 4,763,034 | 8/1988 | Gamble | 310/181 |
| 4,763,034 | 8/1988 | Gamble | 310/181 |
| 4,781,610 | 11/1988 | Mercer | 310/71 |

Primary Examiner—Steven L. Stephan
Assistant Examiner—D. L. Kebsch
Attorney, Agent, or Firm—Leydig, Voit & Mayer

[57] ABSTRACT

The rotor of an electrical motor, such as a hybrid permanent magnet stepping motor or a variable reluctance motor is assembled on a rotor shaft, and includes at least one lamination stack and a pair of supporting bearings, with the outer diameter of the bearings being slightly larger than that of the lamination stack. A stator is assembled from a stator lamination stack including a pole configuration and a pair of unmachined end caps registered and secured to the lamination stack such as by thru bolts. The registered stator assembly is potted to unitize the assembly, fixing the relationship between the end caps and the lamination stack, and providing a smooth continuous bore through the center of the stator assembly. The thus potted assembly is machined as by diamond lapping to form a continuous bore accurately machined through the center of the stator, concurrently forming bearing surfaces in the end caps and an intermediate machined section in the lamination stack. The rotor assembly is inserted into the stator assembly, with the machined bore providing bearing mounting surfaces in the end caps and an air gap for rotation of the rotor in the lamination stack.

10 Claims, 7 Drawing Sheets

ENCAPSULATED MOTOR WITH PRECISION BEARING REGISTRATION

This is a division of application Ser. No. 323,507, filed Mar. 13, 1989, now U.S. Pat. No. 4,922,604.

FIELD OF THE INVENTION

This invention relates to electrical motors, and more particularly to motor structures and assembly techniques which provide relatively small size motors of simple and inexpensive construction.

BACKGROUND OF THE INVENTION

At the outset, it will be pointed out that the invention relates to constructional features and assembly techniques for motors rather than the specific electromagnetic mechanism which drives them. As a result, the present invention can be applied to a number of different motor types including switched reluctance motors, permanent magnet brushless motors and hybrid stepping motors among others.

Chai et al. U.S. Pat. No. 4,029,977 shows a relatively conventional construction for a variable reluctance stepping motor. It is seen that the motor includes an external case machined to register with a pair of end bells which also must be machined to register with both the case and the rotor bearings. The external case, in turn, serves to register a wound and insulated stator lamination stack. Thus, when the elements are assembled, the rotor is held in its bearings in the machined surfaces in the end bells, the numerous registration devices assure that the rotor is properly positioned within the stator. However, such an arrangement carries with it a degree of manufacturing expense because of all of the separate parts must be fairly precisely machined in order for all of the registration systems to function in properly aligning the rotor within the internal bore of the stator.

It has been proposed to produce a motor without an external case, exposing the exterior of the stator laminations. One such approach is illustrated in Kawada et al. U.S. Pat. No. 4,538,084, and another in Kawada et al. U.S. Pat. No. 4,626,725. The former uses threaded rods welded within the stator lamination assembly in order to appropriately register the end caps to the stator. The latter uses threaded rods of two lengths, one interfitting into the end caps and the other on which the end caps bottom in order to maintain registration of the end caps to the stator. While those approaches save the expense of the motor housing, they add complication in the form of such elements for attaining and maintaining registration of the end caps (and therefore the rotor) to the stator.

It is also applicants' understanding that a motor of the general type illustrated in the aforementioned Chai et al. patent has been configured without a case, that is, with the stator laminations exposed intermediate a pair of end caps. As applicants understand it, in order to achieve the elimination of the case, the end caps were altered in two ways. First of all, tapered tabs were formed on the periphery of the end caps, projecting toward the lamination stack at three points around each end cap in order to accurately register the end caps with the lamination stack. Secondly, apertured mounting ears were also formed on the end caps, protruding at right angles from the tabs. The mounting ears received bolts which spanned the lamination stack between end caps to firmly secure the end caps to the lamination stack, thereby not only providing register but also rigidity. In that registered rigid configuration, means were then provided to machine the bore which extended through the end caps and stator assembly. A multi-station lapping machine was used to simultaneously machine bearing surfaces in the end caps and the stator bore. The rotor was then positioned in the machined aperture with the rotor bearings mounted in the end caps and the rotor free to rotate within the stator.

That approach suffers from certain problems. First of all, the exterior tabs and mounting ears on the end caps require the envelope occupied by the motor to be enlarged; in many applications where space is at a premium the enlarged size could be unacceptable. More importantly, machining the bearing surfaces and stator ID with the stator fully assembled results in machining debris entering the motor. The motor was constructed of open configuration, providing large apertures in the end caps which allowed the motor to be thoroughly washed in an effort to remove the machining debris. In addition, machining debris could be trapped within the coils, fall between the end caps and the stator or otherwise lodge itself in apertures in the stator assembly, and that machining debris could work loose during later operation of the motor to cause premature failure.

The stator machining problem could be particularly severe for motors of the "enhanced" type which have permanent magnet segments interposed between rotor teeth, since machining of the rotor bore would then create machining debris which included highly magnetic particles. The magnetic particles would be extremely difficult to remove by standard washing techniques and motor stators were sometimes varnished or otherwise internally coated to secure the magnetic particles which could not be removed in position. Thus, there was created a significant cleanup problem and the possibility of motor failure by means of unremoved machining debris.

One of the problems which has necessitated relatively elaborate registration devices is thermal cycling of the motor in the case where the end caps have a significantly different coefficient of thermal expansion than the stator laminations. The stator laminations are typically steel. The end caps, however, must be nonmagnetic and often made of aluminum which expands much more than the steel when the motor is operating and dissipating heat, and contracts much more than the steel when the motor is at rest and cools. If the end caps are not held in rigid and fixed register with respect to the stator laminations, when the motor is cyclically heated and cooled during operation, the end caps can "walk" with respect to the stator, ultimately causing misalignment of the rotor within the stator.

SUMMARY OF THE INVENTION

In view of the foregoing, it is a general aim of the present invention to provide a small and relatively inexpensive motor with exposed stator laminations which is simpler and more economical to fabricate than the prior art discussed above.

In that regard, it is an object to minimize the cost and complexity of both the end caps and the lamination stack while still achieving the necessary precision in final assembly.

Accordingly to a more detailed aspect of the invention, it is an object to minimize pilot devices on the motor components to the greatest extent possible in order to produce a motor which is simple and easy to assemble with a minimum of register machining on the parts to be assembled.

It is a further object of the present invention to provide a small and relatively inexpensive electrical motor in which the end caps and rotor are machined after assembly and which can be easily and reliably cleaned of machining debris.

According to another aspect of the invention, a further object is to provide an electrical motor which, although it has end caps and stator of substantially different coefficient of thermal expansion, prevents or minimizes walking between those elements.

These and other objects are achieved in accordance with the present invention by providing a motor fabrication technique and the resulting motor which in an early stage of assembly achieves register of a pair of end caps with a wound stator lamination stack. Such registration can be achieved, for example, by bolts passing through clearance holes in one of the end caps, clearance holes stamped in the laminations of the lamination stack, and into an aperture in the other end cap while those elements are held in position on an arbor. Having achieved this initial registration and created a unitized stator assembly, the stator assembly is then potted, fixing the positional relationship between the end caps and the stator lamination assembly. Following potting, the central bore is machined, preferably by lapping, to form bearing mounting surfaces in the end caps and to machine the internal bore of the stator lamination stack to provide a running air gap between the rotor and stator. A rotor assembly, comprising the rotor section itself and a pair of bearings, has the bearings of slightly larger outer diameter than the stator section. The rotor assembly is inserted into the machined bore in the stator assembly and fixed in place to produce a completed motor.

It is a feature of the invention that the potting material fixes the relationship between the end caps and stator lamination stack, and subsequent machining of the internal stator bore accommodates for any misregistration which might have occurred during the initial registration before potting.

It is a further feature of the invention that the smooth continuous internal bore of the stator assembly prevents machining debris from falling into the motor and provides a stator assembly which can be easily cleaned following machining.

It is a further feature of the invention that heat transfer from the motor is enhanced by virtue of the potting material which fills internal voids and has a better thermal coefficient than air which normally fills such voids in conventional motors.

According to a further feature of the invention, the potting material prevents walking of the metallic stator components, particularly in the case where the end caps have significantly different thermal coefficents of expansion than the lamination stack.

According to an optional feature of the invention, the motor can be produced in an "enhanced" configuration, having permanent magnets inserted between the teeth of the stator poles. The potting material is allowed to envelope the stator poles, thereby securing the permanent magnets into the gaps between the teeth. Subsequent machining of the bore removes some of the potting material and machines sharp square faces on the stator teeth while still allowing the potting material to assist in holding the permanent magnets in their pole slots. The sharpness of the stator teeth edges is enhanced by the potting material in the gaps between the teeth which serves as a backing member for the teeth, preventing distortion which can be caused by material shearing or slight tooth deformation during machining. The magnetic debris generated during machining of the inserted magnets is easily and reliably cleaned from the smooth continuous bore of the potted stator.

Other objects and advantages will become apparent upon reference to the detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE EMBODIMENTS

Figures 1, 2:
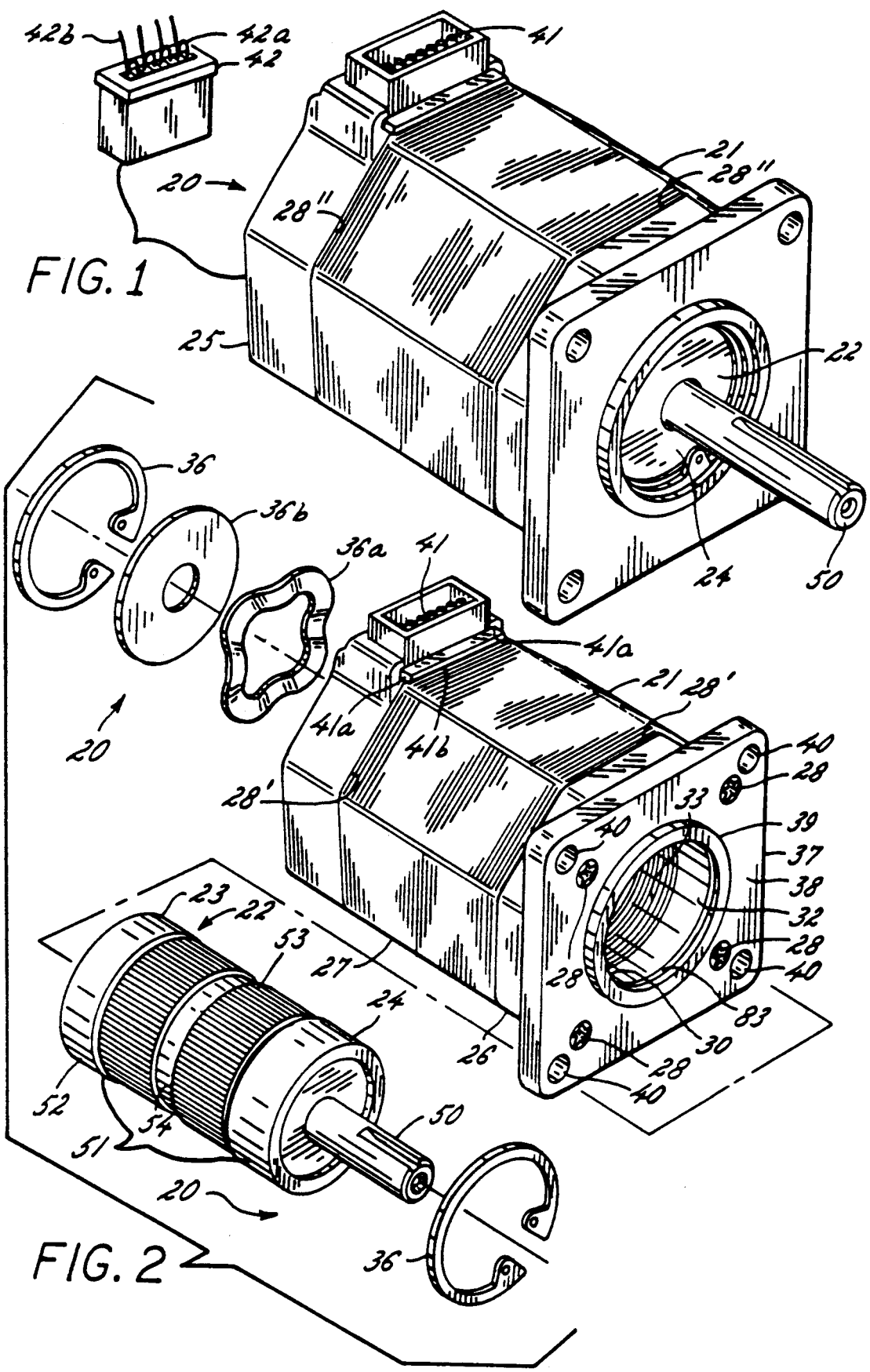
FIG. 1 is a perspective view illustrating a completely assembled motor constructed in accordance with one embodiment of the present invention.
FIG. 2 is a partly exploded view showing a motor according to the invention with the rotor assembly removed from the stator assembly.

Turning now to drawings, FIG. 1 shows a perspective view of a hybrid permanent magnet stepping motor, and FIG. 2 a partly exploded view showing the rotor and rotor retaining elements removed from the stator assembly. It will be noted at the outset, however, that while the invention will be described in connection with a hybrid stepping motor, it is also applicable to other motor types, particularly in the small size range. For example, a brushless variable reluctance stepping motor of the Chai et al. type could be constructed in accordance with the present invention by configuring the rotor and stator assembly as a variable reluctance motor. Similarly, the invention is applicable to permanent magnet brushless motor designs, switched reluctance motors, enhanced variable reluctance motors, as well as enhanced and unenhanced stepping motors of the hybrid stepping type. Finally, induction motors could also utilize the present invention as could other motor types as will be apparent to those skilled in the art upon reading the following detailed description.

Referring to FIGS. 1 and 2, there is shown a hybrid stepping motor generally indicated at 20 comprising a stator assembly 21 and a rotor assembly 22. The rotor assembly is fitted with bearings 23, 24 which in turn mount in end caps 25, 26 to support the rotor assembly 22 for rotation in the stator assembly 21. The end caps 25, 26, sandwich a central stator lamination stack 27 which carries stator poles and windings (not shown in FIGS. 1 and 2). In the currently preferred embodiment, the end caps 25, 26, and the lamination stack 27 are secured together, initially by means of mounting bolts 28 which preferably pass through clearance holes in front end cap 26 and lamination stack 27 and are secured in apertures in rear end cap 25. In a further embodiment, the bolts 28 and the end cap apertures for receiving those bolts can be eliminated (as illustrated in FIG. 1) and the end caps initially secured to the stator assembly by means of a suitable adhesive applied to the seams indicated by 28'. While that arrangement places greater emphasis on the initial securement by means of adhesive, it is advantageous in eliminating the need for mechanical devices such as bolts and the necessary apertures for providing the initial unitized assembly.

As will be described in greater detail below, the unitized elements after being joined by bolts, adhesive, or the like are further secured together by means of a potting compound which completely encapsulates the secured members and preferably projects partly into a central bore 30 after potting. The bore 30 is then machined as by lapping to form bearing surfaces 31, 32 in the end caps 25, 26 and also to form a smooth bore 33 through the lamination stack 27, contiguous with the bearing surfaces 31, 32. Retaining rings 35, 36 secure the rotor assembly in the stator assembly. The front end cap 26 has a flange 37 which in turn has a machined surface 38 with a mounting boss 39 to locate the motor in a mounting bracket. Mounting holes 40 provide means for mounting the motor to its bracket (not shown). The rear end cap 25 is provided with an electrical connector 41 for supplying power to the stator windings.

As shown in FIG. 2, the rotor assembly 22 includes a rotor shaft 50 which supports a rotor section 51, (i.e., the portion of the rotor which is magnetically active) and outboard bearings 23, 24. In the illustrated embodiment, the rotor comprises toothed lamination sections 52, 53 separated by a permanent magnet 54. The magnet is positioned to provide the lamination sections 52, 53 with opposite magnetic polarities, for example, making lamination section 52 a north pole and lamination section 53 a south pole. The laminations are formed with external teeth, of the same pitch as the teeth associated with the stator assembly. The teeth of section 53 are offset by one half pitch with respect to the teeth of the section 52 in order to form a hybrid permanent magnet rotor. Thus, when the stator windings are energized by drive current coupled through connector 41, the rotating magnetic field which is produced in the stator tends to successively align the rotor lamination sections 52, 53, with the field, causing the motor to step in sequence with the rotor field. Control of the rotational rate and direction of the stator field thus allows control of the rate and direction of rotor rotation.

Figure 3:
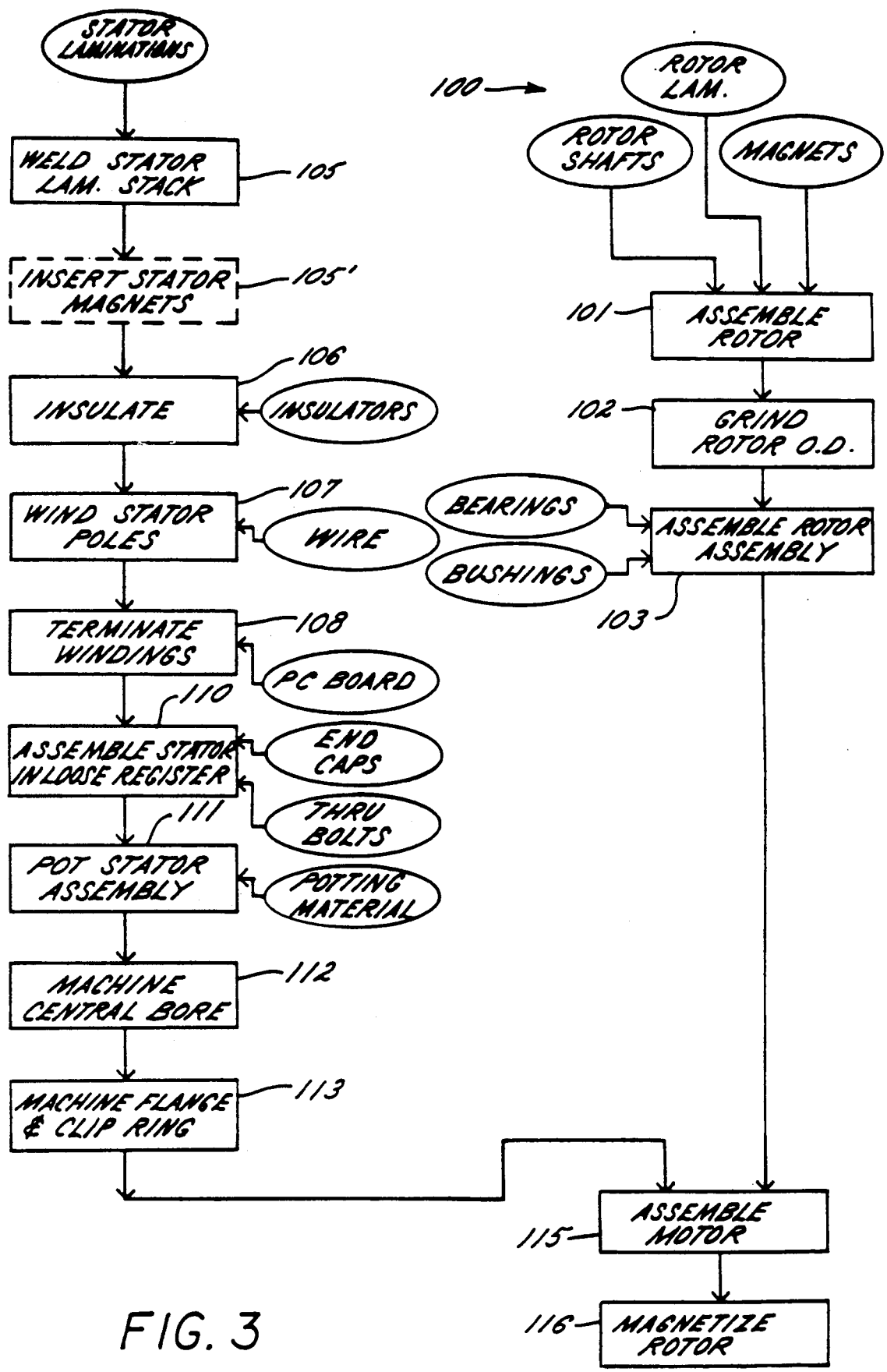
FIG. 3 is a process flowchart illustrating the steps of constructing a motor in accordance with the present invention.
Figure 4:
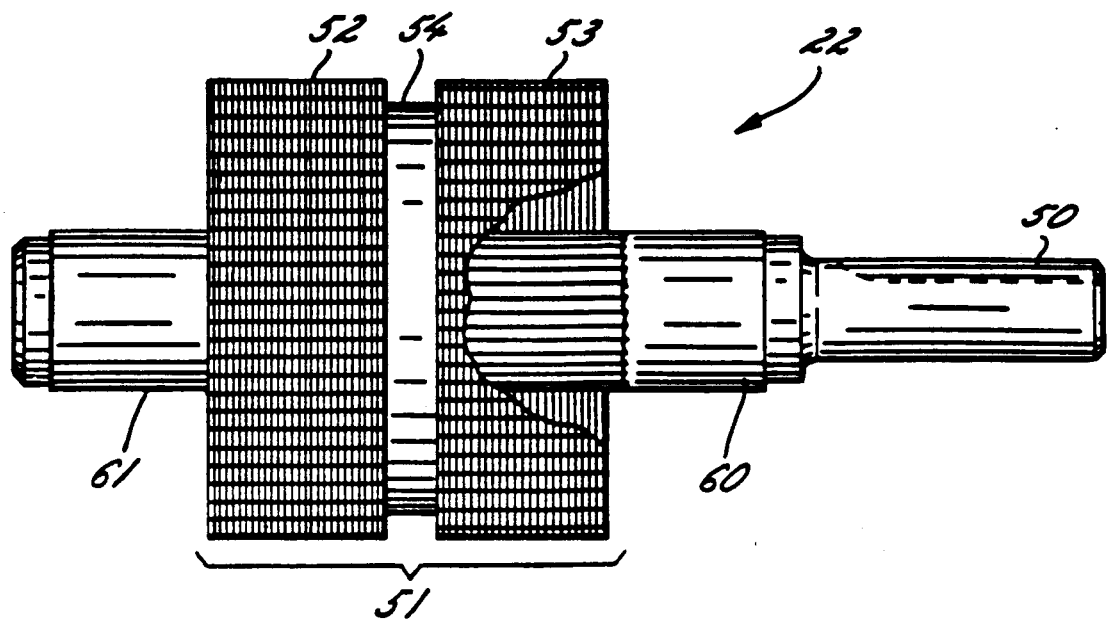
FIG. 4 is an elevational view illustrating a partially assembled rotor.

Turning now to FIG. 3, there is illustrated the process for fabricating a motor in accordance with the present invention. Concentrating first on the rotor assembly, it is seen that the primary raw materials which go to make up the rotor are brought together at process step 100, and include rotor shafts, rotor laminations (or prestacks) and magnets. Those items are assembled at a step 101 and the assembled rotor which results is best illustrated in FIG. 4. There is shown a rotor shaft 50 having a pair of lamination stacks 52, 53 disposed thereon, with a permanent magnet 54 interposed between the lamination stacks forming a rotor section 51 intended to be driven by the rotating magnetic field produced by the stator. In a hybrid permanent magnet stepping motor, the rotor laminations 52 and 53 have alternate teeth and valleys of a given pitch corresponding to the stator pitch, and the teeth in the sections 52 and 53 are offset with respect to each other by one-half pitch. The magnet 54 serves to magnetically polarize the stacks 52, 53 with, for example, the stack 52 being a north pole and the stack 53 being a south pole.

The shaft 50 has a pair of machined sections 60, 61 adapted to receive the inner race of bearings for support of the rotor. The shaft 50 can have its output end keyed as illustrated or unkeyed if desired, and the motor can also be configured with an output shaft on the rear end to form a double-ended motor. Such constructional details form no part of the present invention and will not be emphasized herein.

Having assembled the rotor 22 in the step 101 (FIG. 3), the rotor is then passed to a grinding station where step 102 is performed to grind the rotor outer diameter. Such grinding tends to produce teeth in the lamination stacks 52, 53 which have relatively sharp corners. In addition, the grinding step produces a rotor which is substantially concentric and therefore can operate in a carefully machined stator bore with a relatively small air gap.

Figure 5:
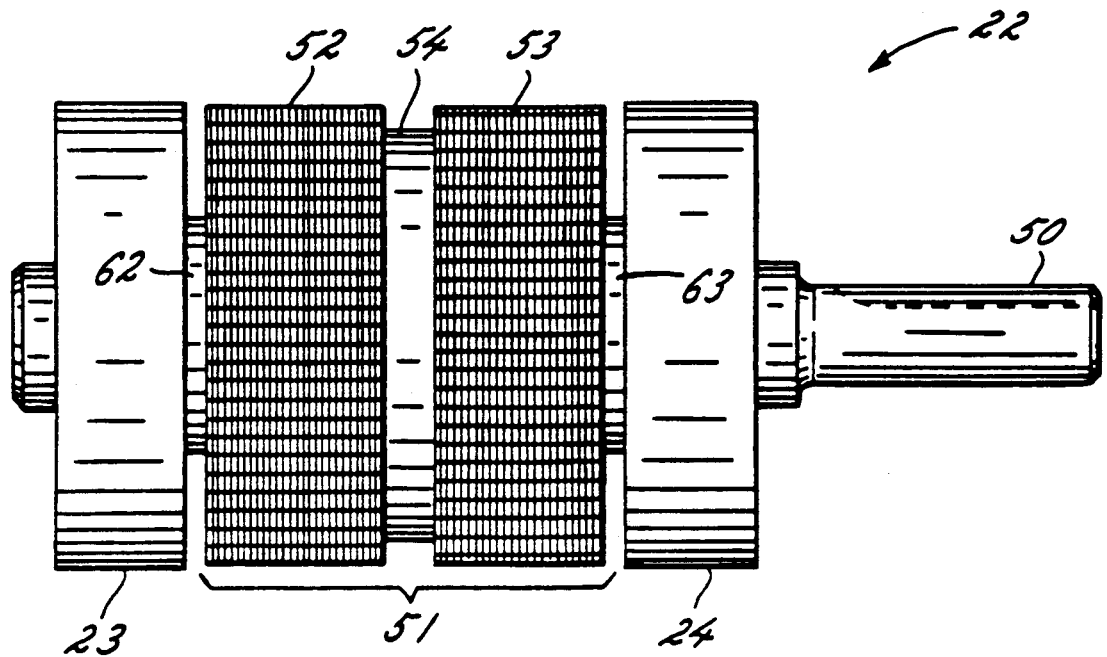
FIG. 5 is an elevation illustrating a rotor assembly with bearings and bushings in place and ready for insertion into a stator assembly.

Having thus configured the rotor magnetic section 51, and after machining debris is cleaned from the rotor, a step 103 is then performed in which bearings 22, 23 are assembled onto the bearing support surfaces 60, 61 of the rotor. In the exemplary embodiment, spacer bushings 62, 63 are interposed between the bearings 23, 24 and the lamination stacks 52, 53 respectively. The bushings ride between the lamination stack and the inner race of the bearings to form a spacer element to properly locate the bearings on the shaft. The bearings are press fit on the shaft, preferably in an appropriate fixture, in the step 103. Referring to FIG. 5, there is shown the rotor assembly including bearings 23, 24 and the spacing bushings 62, 63, providing a rotor assembly which is ready for insertion into a stator assembly. FIG. 5 illustrates, in somewhat exaggerated fashion, the fact that the outer diameter of the bearings 23, 24 is slightly greater than the outer diameter of the rotor section 51. It was previously noted that the stator bore is a continuous straight through bore formed in a single operation after assembly of the stator. Thus, providing the bearings 23, 24 with a slightly greater outer diameter than the rotor section 51 allows the entire rotor assembly to be inserted into the bore, with the outer race of the bearing 23, 24 seating in the bearing surfaces in the end caps while the rotor section 51 has a sufficient, although a very small, clearance for rotation. The precision thus achieved allows the motor to be configured with a relatively small air gap, thus allowing highly efficient operation.

Figure 6:
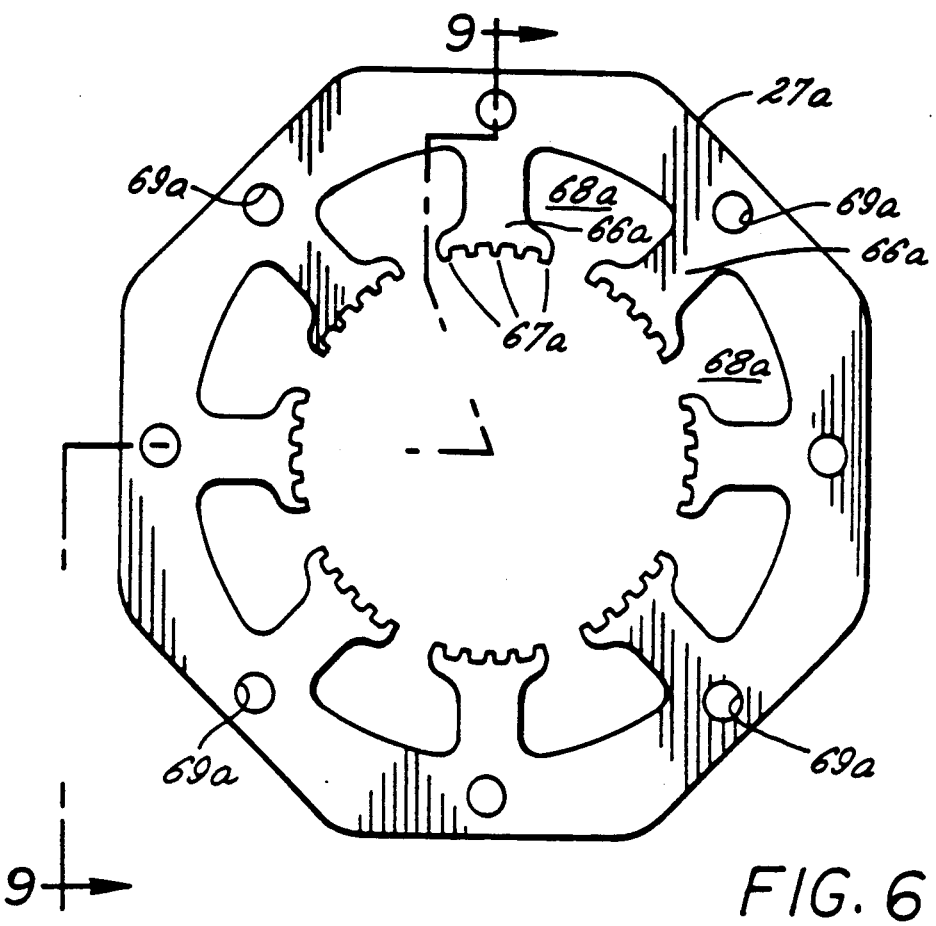
FIG. 6 is an elevation illustrating an individual stator lamination.

As illustrated in FIG. 3, the initial raw material component for the stator assembly procedure is individual stator laminations which are assembled in a step 105. An individual lamination 27a is illustrated in FIG. 6. It is seen that each lamination, which can be formed by stamping, has a series of poles 66a with a plurality of teeth 67a formed on each of the poles. In a hybrid permanent magnet stepping motor, the pitch of the teeth 67a is the same as the pitch of the rotor teeth. The poles 66a are separated by gaps 68a which provide an area for receiving the stator windings. The laminations also have punched clearance holes 69a through which the bolts 28 can pass for initially registering the stator assembly. Preferably a clearance hole 69a is associated with each pole 66a such that the stator laminations are symmetrical and can be installed in any of eight orientations. Thus, it is possible in assembly to turn the stator laminations with respect to each other such that the grain of the steel from which the laminations are made is not in a single direction, allowing the magnetic properties of the lamination stack due to grain to be averaged.

Figure 7:
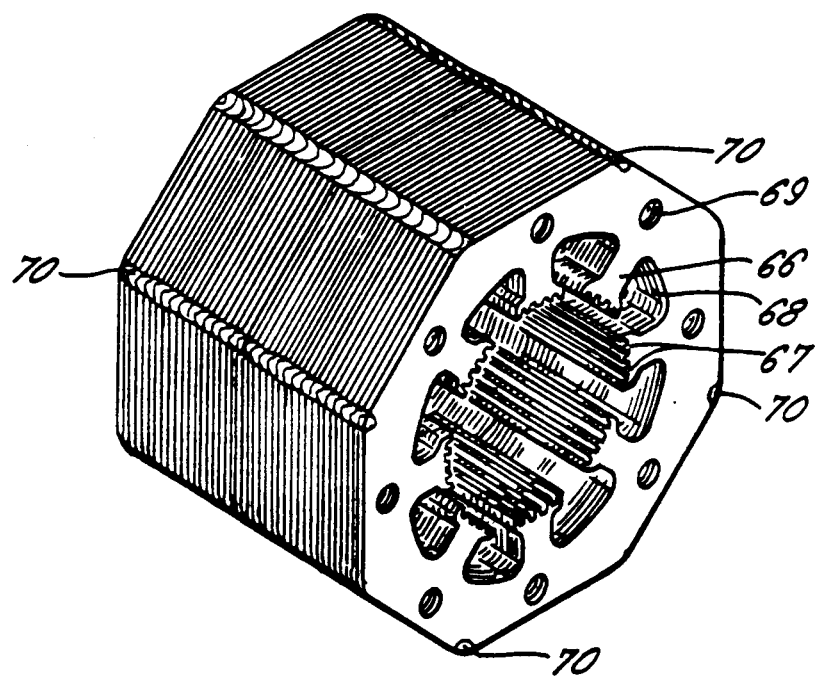
FIG. 7 is a perspective view showing an assembled lamination stack made up of individual laminations as illustrated in FIG. 6.

As illustrated in FIG. 7, the step 105 (FIG. 3) is implemented by assembling a stack of laminations of a predetermined height and affixing the laminations together, in the illustrated embodiment by means of welds 70. Alternatively, prestacks, i.e., groups of laminations joined by stamped dimples formed during the lamination stamping operation may be used. Using the welding technique, preferably a stack of laminations is placed under pressure, and automatic machinery gauges that the lamination stack is of the appropriate height before the welds are made. If it is not laminations are either added or removed until the desired height is obtained at which point automatic welding equipment preferably applies four welds 70 at corners of the lamination stack displaced 90 degrees from each other. As seen in FIG. 7, the assembled lamination stack thereupon provides a pole structure 66 separated by inter-pole winding gaps 68, each pole structure having axially disposed teeth 67 of a predetermined pitch. It is also seen that the clearance holes 69 are aligned such that an assembly bolt or potting injection needle can pass through the lamination stack at the appropriate point in the assembly process.

Figure 12:
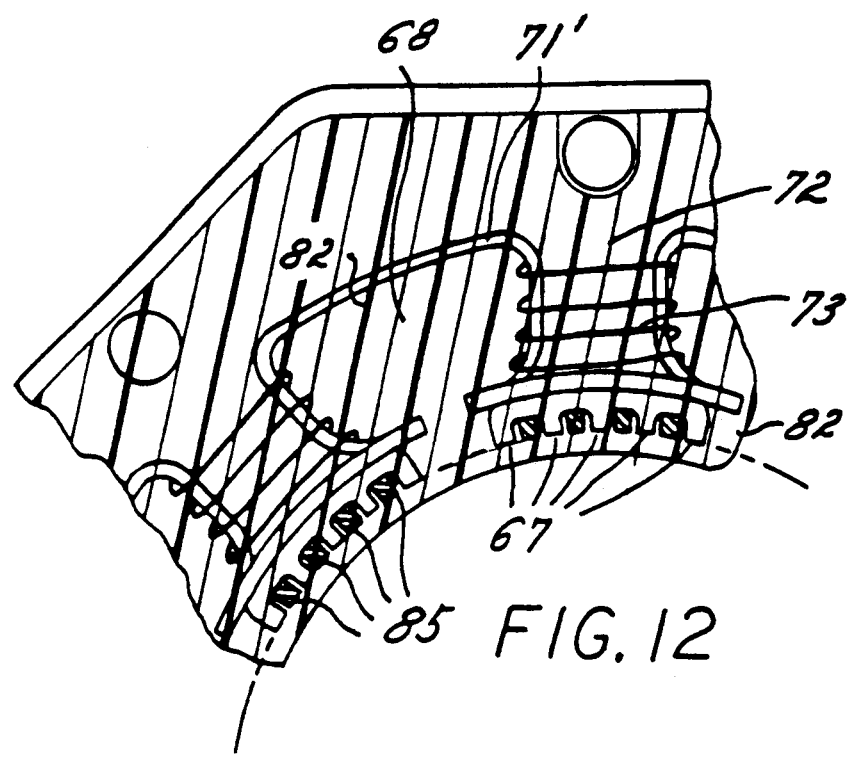
FIG. 12 is a partial view (without end cap) illustrating the partly completed stator assembly of FIG. 9 after potting.

After the lamination stack is assembled, and in the optional case where an "enhanced" motor is to be produced, in a step 105' elongate magnetic strips are inserted in each gap 85 between stator teeth 67 (see, for example, FIG. 12). As will be described below, the magnets which are inserted between stator teeth tend to enhance the magnetic properties of certain classes of motor. The magnetic strips have sufficient frictional engagement with and magnetic attraction for the gaps into which they are inserted to temporarily maintain the strips in place during subsequent manufacturing steps until they are firmly secured in their gaps by means of injected potting material.

Figure 8:
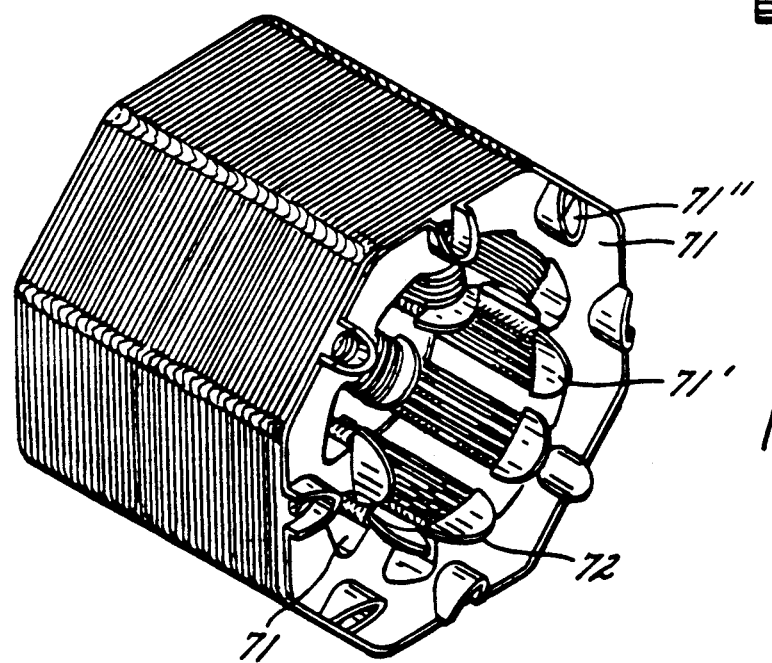
FIG. 8 is a perspective view illustrating the lamination stack of FIG. 7 with insulators and windings in place.
Figure 10:
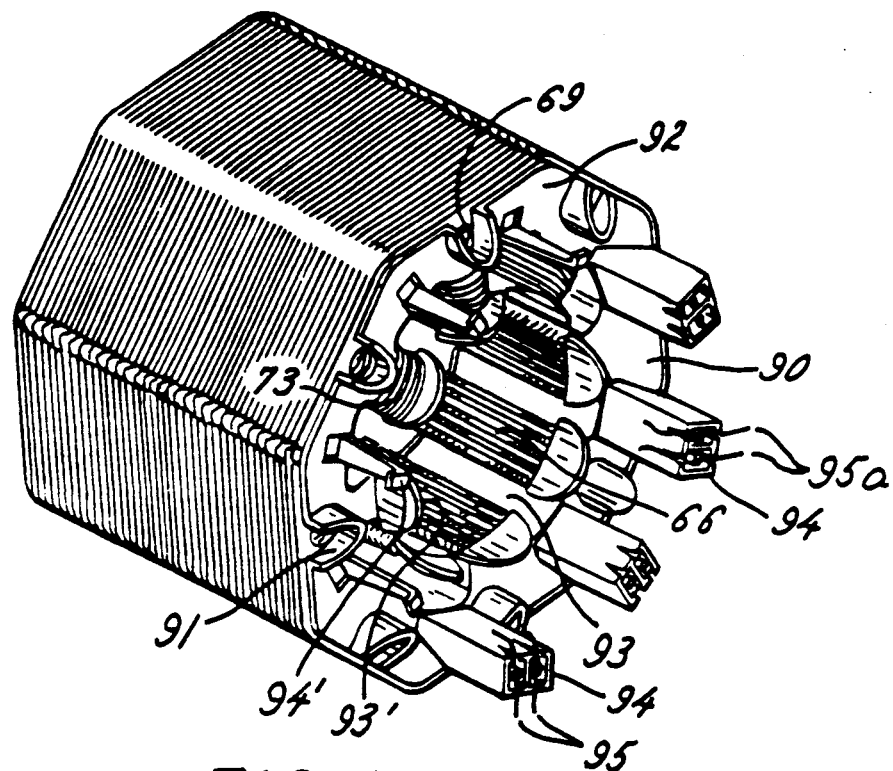
FIG. 10 is a perspective view illustrating the connector end of the lamination stack of FIG. 7.

Following the magnet insertion step 105' if performed, or the simple welding of the lamination stack 105 for a non-enhanced motor, as shown in FIG. 3, subsequent operations are performed on the assembled lamination stack to associate the stator electrical components with the stack. In other words, the stack is insulated, wound, and the windings are terminated. In FIG. 3 the insulation step is indicated at 106. Preferably discrete insulators are supplied along with the welded stator lamination stack in order to provide appropriate insulation. Turning briefly to FIG. 8, one end of the insulator assembly is schematically illustrated at 71 and is shown to completely line the slot 68 as well as to cover the face 72 of each pole 66. Upstanding insulator sections 71' will interface with the end cap when they are juxtaposed and bolt protectors 71'' insulate the through-bolts 28 and prevent contact between the bolts and the windings. A mating end for the insulator is illlustrated in FIG. 10 at 90. It is seen that the insulator 90 is similar to the insulator 71 in that it provides protectors 91 for the through bolts, a face 92 for insulating the end of the pole, channels 93 which completely line the inter-pole slots, and upstanding projections 93' for interfacing with the associated end cap. In addition, the insulator 90 includes connector means 94 for terminating the windings as will be described below and upstanding standards 94' which serve two purposes. First of all, they provide a seat on which the circuit board which carries the connectors for mating with the connector means 94 seats, and secondly they provide a path for jumper walkers connecting a pair of coils, keeping the jumper wires in a controlled safe location where they will not short with other elements of the motor. More particularly, in many motors the automatic winding equipment winds one coil and then is moved to another pole, carrying the wire along to wind a second coil before the second end of the wire is terminated. In that case, the wire is brought by automatic winding equipment around the outside of the adjacent standard 94' and the inside of the bolt protector 91 so that it is restrained to the outside of the stator assembly but assured to be free of contact with the through bolt.

Having thus insulated the pole structure, windings schematically illustrated at 73 are applied, preferably automatically, to each of the poles in a step 107 (FIG. 3). It will be appreciated that in the typical case a winding of significant dimension (more significant than illustrated in FIG. 8) will build up in order to get the necessary turns on each pole. It is seen, however, that the turns are insulated from the magnetic structure by means of the insulator 71. In addition, when the automatic winding equipment winds two coils before terminating the winding, the exposed inter-pole connection is routed between the standards 94' and the bolt protectors 91 as described above. The automatic winding equipment which forms the coils 73 also preferably automatically terminates the coils in the connectors 94. In the preferred embodiment, the coils are bifilar wound, and each connector 94 provides for terminating two individual wires. Thus, at the start of the winding, the automatic winding equipment lays the beginning end of a coil into slot 95, then winds two of the poles, then lays the end of the coils in a further slot 95a in a second one of the connectors.

Figure 11:
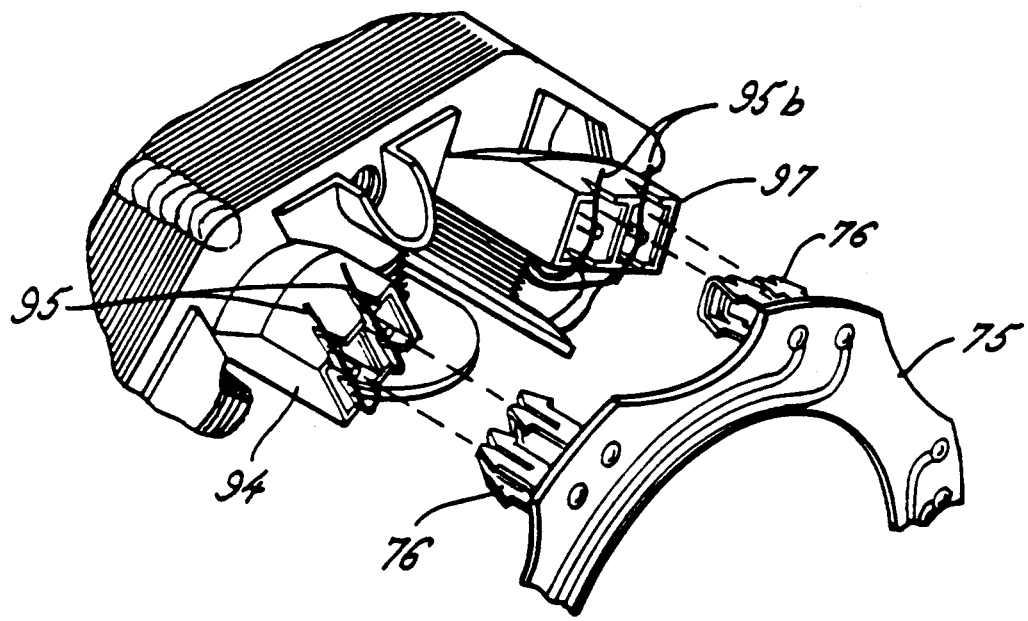
FIG. 11 is a partial view illustrating the relationship between the connectors of FIG. 10 and the mating circuit board.

With all of the coils wound, and the beginning and ending ends of the coils inserted in appropriate slots 95, 95a, a step 108 (FIG. 3) is then performed to terminate the windings. In the illustrated embodiment the termination is accomplished via a printed circuit board 75 which carries the connector 41 and which also carries a plurality of tabs 76 connected to appropriate pins of the connector 41 by means of printed circuit board connections. In performing the termination step 108, as best shown in FIG. 11, the printed circuit board is put in place over the connectors 94, and the tabs 76 forced into the connectors 94. Using the illustrated terminating means, when the tabs 76 are forced into the connectors 94, mating apparatus on the tabs and connectors serves to force the wire which had been layed into slots 95 into electrical contact with the mated tabs and connectors, secures the wire in place, and severs the tail of the wire for removal. Thus, with the printed circuit board in place, all of the terminations are automatically made and electrical connections are available from all of the coils to the connector 41.

It is noteworthy that eight ends of the eight coils are individually terminated and separately brought to associated pins in the connector 41. That allows manufacture of basically the same motor while still providing for sale of a variety of motors with different pole structures. More particularly, in stepping motors and other electronically driven motors it is conventional to use four pole, six pole or eight pole motors with drivers of related configuration. In an eight pole motor, an eight pole drive would be used to individually control each coil pair. In a four or six pole configuration, however, the eight motor poles are connected together by the user in ways determined by the four or six pole requirements. Alternatively, the manufacturer must wind and stock separately four, six and eight pole motors. As a feature of the preferred embodiment, having brought connections for each of the eight pole pairs out to connector 41, a mating connector 42 is supplied with the motor which has, when it is configured for less than four pole operation, jumpers 42a connecting selected ones of the wiring along with connections 42b for connection to the, in the illustrated embodiment, four pole drive. Thus, supplying the mating connectors 42 with appropriate jumpers 42a allows the manufacture of only eight pole motors with a simple external connection used to convert what had been manufactured as an eight pole motor to a four or six pole configuration.

Having thus configured the stator electrical components including the magnetic stator lamination stack and the associated electrical components, a step 110 (FIG. 3) is performed to assemble the stator, including the lamination stack 27 and the end caps 25, 26. The end caps 25, 26 are unmachined castings, preferably aluminum, and have no pilot tabs or registration devices. In the preferred practice of the invention, a fixture is used to register the end caps to the stator assembly before those elements are preliminarily secured to each other. The elements can be registered either from the outer diameter of the lamination stack and end caps or from the inner diameter of the bore. Preferably, the inner diameter of the bore is used for registration, and the end caps and lamination assembly are inserted on an arbor which may be stepped and expandable so that when the elements are placed over the arbor, it can be expanded for a central section of slightly larger diameter and end sections of slightly smaller diameter than the central section to engage respectively the ID of the lamination stack and the ID's of the end caps. The arbor assures that the center line of the laminating stack matches the center lines of the end caps. When held in that position, the elements are preliminarily secured by four bolts 28 which pass through clearance holes 80 in the front end cap 26, clearance holes 69 through the lamination stack and are secured in apertures 81 in the rear end caps 25. Preferably the bolts 28 are of the self-threading type and the apertures 81 are adapted to be threaded when the bolt is inserted and driven by means such as power screw driver. Preferably, the power screwdriver has a torque limit which is preset so that all of the bolts are inserted with very nearly the same torque thereby to minimize any tendency for the end caps and lamination stack to misalign.

Since, in practicing the invention, the motor is to be filled with a liquified potting compound, the practice of the invention further contemplates the sealing of the stator elements to prevent leakage of the potting material when it is in its liquid form. One potential area for leakage is between the connector 41 and the associated end cap 25 and lamination stack. In practicing this aspect of the invention, the connector 41, the end cap 25 and the lamination stack 27 are particularly configured with respect to each other to prevent leakage. More particularly, a three-sided tongue and groove arrangement 41a (see FIGS. 2 and 9) is provided to seal three sides of the connector, and the connector is provided with an abutment 41b which engages the end of the lamination stack 27 and is snugged thereagainst when the elements are assembled in the fixture. The tongue and groove arrangement 41a and the abutting seal 41b prevent leakage of potting material from around the connector 41. In addition, leakage which could occur between the margins 28' of the end caps 25, 26 is prevented by application of a sealant between those elements before they are inserted on the arbor for assembly. It is preferred to use a sealant sold under the trademark Loctite, and sealant is applied to the edges of the end caps 25, 26 immediately prior to insertion of those elements in their respective positions on the assembly arbor. A small quantity of such sealant is preferably maintained in an annular trough and the operator simply takes, for example, end cap 25 and inserts the open end into the trough to apply a thin layer of sealant on the edge of the end cap flange before placing the end cap on the arbor. Similarly, after placement of the lamination stack 27 over the first end cap 27 on the arbor, the end cap 26 is dipped before it is placed on the lamination stack.

As noted above, and as illustrated in the FIG. 1 embodiment, in some circumstances it may be desirable to eliminate the connecting bolts 28 together since the integrity of the final motor will be assured by the inner mass of potting material which completely fills the stator assembly. In that case, the end caps 25, 26 would be modified to eliminate the holes which accommodates the bolts 28. However, it is preferred to retain the apertures 69 in the lamination stack since they cooperate with the epoxy injecting apertures (to be described below) which are formed in the end cap 25. When forming a non-bolted unitary assembly, a liquid adhesive 28" is applied to the end caps 25, 26 before assembly on the arbor, just as the Loctite sealant was applied in the bolted arrangement. The assembly procedure is substantially the same as in connection with the bolted configuration with the exception that the adhesive which bonds the materials together must be fast-setting because the unitized assembly must be left on the arbor until the adhesive has bonded the parts together. In addition, when using the non-bolted arrangement, it is preferred to use a potting material which will cure rather rapidly and whose potting and cure conditions will not affect the bond produced by the adhesive which maintains the integrity of the unitized stator assembly.

Figure 9:
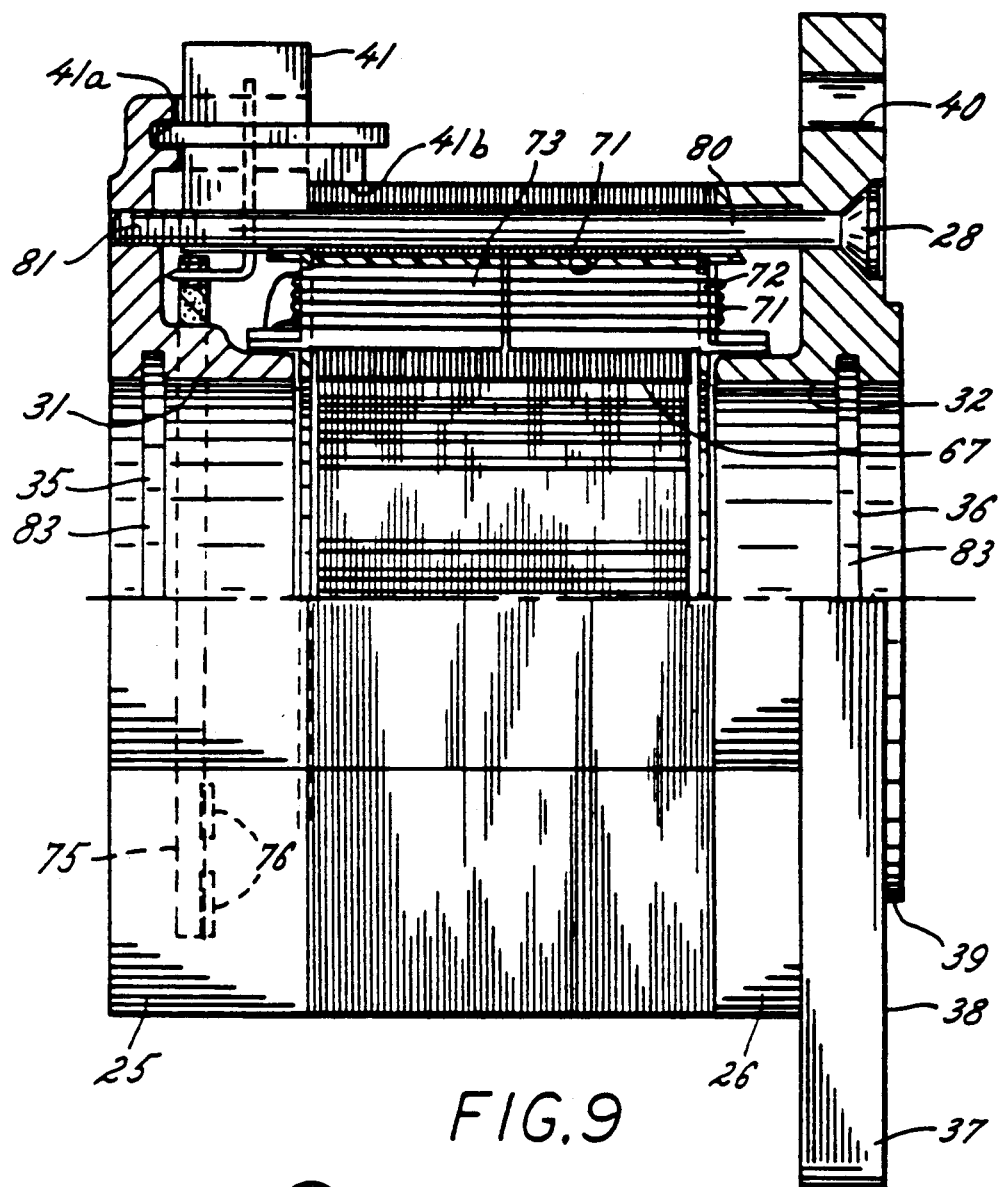
FIG. 9 illustrates a wound stator assembly with end caps and printed circuit board in place.

In accordance with the invention, the preliminarily secured assembly, registered by means of the assembly fixture, is permanently secured in position by potting of the stator assembly, following which the concurrent machining of the bearing surfaces in the end caps and the stator bore provides a registered, fixed stator assembly ready to receive its associated rotor assembly FIG. 9 shows the stator assembly prior to potting with the bolts 28 in place. It also shows, as was noted above, the printed circuit board which terminates the stator windings and brings them to the external connector 41. With the stator assembly in the configuration illustrated in FIG. 9, or in a similar configuration but without bolts 28 in the non-bolted embodiment, a step 111 (FIG. 3) is accomplished to pot the stator assembly. Preferably potting is accomplished with a central arbor inserted through the bore of the stator providing a small clearance between the stator laminations and the arbor, but closely fitting within the end caps. Preferably, the potting arbor is made of silicone rubber or has a silicone rubber exterior to assist in insertion and removal of the arbor. Silicone rubber has a tendency to significantly expand when heated and contract when cooled. Thus, the arbor is inserted into the unpotted stator assembly when cold and thus easily slides inside the bore. After potting is completed and the rotor cooled, the arbor contracts sufficiently so that it can be removed without the use of an arbor press.

In order to minimize voids in the potted assembly, prior to potting both the unpotted stator assembly (with inserted arbor) and the potting material are heated. Recalling that the potting arbor expands upon heating, and that the unpotted stator assembly has two different inner diameters, i.e., a smaller ID at the end caps and a slightly larger ID at the lamination stack, the potting arbor will expand until it securely contacts the ID's of the end caps but leaves a small gap, in one embodiment on the order of 0.005" between the outer surface of the arbor and the stator teeth in the lamination stack. Thus, when potting material is injected into the stator assembly, a continuous runner of potting material will cover the stator teeth, assuring that the inter-tooth gaps are all filled with potting material.

In the preferred practice of the invention, for the purpose of potting, a pair of small apertures are provided in the rear end plate 25 which align with a pair of the lamination stack apertures 69. A needle is inserted through one of the end cap apertures, and extends through the stator assembly to the front end cap. Heated potting material is then injected through the needle such that stator fills from the bottom up. Air is thus forced out of the assembly through the second end cap hole as potting material fills the voids, and the arbor prevents potting material from entering the internal bore except for the thin runner which covers the stator teeth and fills the inter-tooth gaps. Potting material 82 thus completely fills all voids, forming a pair of donuts within each of the end caps joined by finger-like elements which fill each of the winding slots 68 in the stator. After the potting material is injected to completely fill the stator, the needle is withdrawn. The stator is then put into a post-cure process which raises the temperature of the assembly to about 250° F. The post-cure treatment tends to further stabilize the epoxy, preventing outgassing or void formation during use of the motor, and providing an even more stable assembly.

Figure 13:
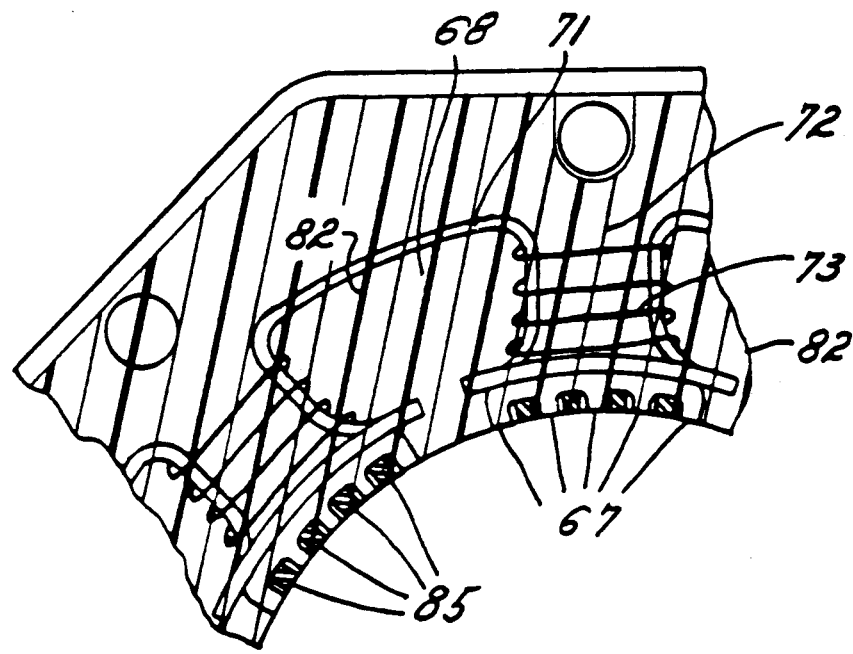
FIG. 13 is a view similar to FIG. 12 illustrating the potted stator assembly after it has been machined and is thus ready for insertion of the rotor assembly.

After potting is completed and the stator assembly removed from the arbor, the stator appears as suggested in FIG. 12. As noted above, when the assembly with inserted arbor cools, the shrinkage of the arbor allows easy removal thereof without the need for an arbor press. The potting material 82 completely covers all of the pole teeth 67, fills all of the voids around the windings as shown in FIGS. 12 and 13 as well as all voids in the end caps, to form a continuous surface extending through the center of the stator assembly from end cap to end cap. The potting compound is preferably chosen to have a thermal coefficient of expansion and elasticity which is intermediate those of the end caps which are preferably aluminum, and the stator laminations which are steel. It will be appreciated that the aluminum end caps have a thermal coefficient of expansion which is substantially greater than that of the stator laminations, and in normal practice would tend to "walk" as the motor heats and cools during periods of use and rest.

The shape assumed by the injected potting material within the motor is significant. As noted above, the potting material forms a unitary structure comprising a pair of donuts within the respective end caps joined by, in the illustrated embodiment, eight spring-like fingers filling the winding slots 68. Although the aluminum end caps tend to expand more than the stator lamination stack when heated, the spring fingers connected to the donuts act like a homogeneous spring to allow all of the elements to expand together (although at different rates) and, when the elements cool and contract to bring them back to their initial position. A presently preferred potting compound is produced by Hardman Inc. (Epocap 16358) which is a heat cure epoxy potting and encapsulating compound having a substantial quantity of an appropriate filler.

Furthermore, the potting material is selected to have a thermal heat transfer constant which is substantially better than that of air, and thus the motor is better able to conduct heat generated in the stator to the outside to dissipate the heat. As a result, temperature buildup in the motor is reduced, particularly as compared to a motor having a conventional case, and efficiency in terms of watts input per unit torque output, is substantially enhanced.

Having thus potted the stator assembly in the step 111 (FIG. 3) a step 112 is performed to machine the central bore. Any number of machining techniques can be utilized to form the central bore including boring, grinding, broaching, honing or lapping. In the presently preferred embodiment of the invention, lapping is used preferably with multiple lapping stations. In very high volume manufacture, broaching may be preferable. In the currently preferred practice of the invention, multiple diamond lapping stations are used, and are arranged to assure that some material is removed at each station. The initial cuts remove primarily potting material from the stator and aluminum from the end caps until the lapping operation has opened the bore 33 so that the lapping tools contact the stator laminations. Thus, as the successive lapping operations are carried out, material is ultimately removed from the teeth 72 of the stator assembly and at the same time from the bearing surfaces 31, 32 of the end caps to machine a smooth and continuous bore 33 through the entire stator assembly. The machining in the end caps forms bearing surfaces for slip fit of the rotor bearings while, as shown in FIG. 11, the machining of the lamination stack sharpens the corners of the stator pole teeth 67 to produce a uniform bore for minimum air gap and enhanced magnetic coupling.

It will be appreciated that in practicing the invention no machining was needed on either of the end caps 25, 26 prior to the lapping operation which forms the bearing surfaces. Typically, motors have machined flanges for accurate mounting of the motor in its end use apparatus. Thus, having completed the lapping operation and thus formed a central bore in the motor which will define the center line of rotation of the rotor, that bore is used as a registration pilot for machining a mounting flange 38 on the face of the motor. Typically, the flange is machined on a lathe, and subsequent to machining of the mounting flange, the tool is changed and grooves 83 are machined in the bearing surfaces 31, 32 for accepting the retaining rings 35, 36. Following the performance of the step 113 for such finish machining, the stator assembly is prepared to receive a rotor and thus produce an assembled motor. More particularly, a step 115 is performed in which the rotor assembly produced in the step 103 is joined with the stator assembly produced in the step 113 to produce a completed motor. It is simply necessary to install one of the retaining rings, say, front ring 36 in the end cap 26, than to slide the rotor assembly with bearings into the bore 33. Thrust means 36a such as a wave washer and spacers 36b, if necessary, are then installed above the bearing to load the bearings in one direction. Following insertion of the rotor, spacers, if any, and loading means, the rear clip 36 is put in place producing a completed motor. A step 116 (FIG. 3) is then performed to magnetize the rotor in a conventional fashion.

One of the significant advantages which is achieved by the assembly techniques of the present invention is the ability to produce "enhanced" stepping motors, that is, motors having magnetic inserts between the stator teeth for enhancing the flux paths and producing correspondingly enhanced performance. Reference is made to the following U.S. patents for a description of the structure and function of enhancement achieved by insertion of magnets in the slots between the teeth of the pole structure: Horber U.S. Pat. No. 4,712,028, Mastromattei U.S. Pat. No. 4,713,570 and Gamble U.S. Pat. No. 4,763,034. FIGS. 12-13 of the present application show the techniques of the aforementioned patents applied to the instant motor structure. No attempt was made to illustrate the inserts in the other smaller scale figures in order to avoid confusing those drawings. However, from the illustration of FIGS. 12 and 13, it will now be apparent to those skilled in this art how the enhancement magnets are utilized in practicing the present invention. As shown in FIGS. 12 and 13, magnetic segments 85 are inserted in gaps 86 between the stator teeth 67. While in the past it had been necessary to glue the segments in place then vacuum impregnate the pole faces, or to varnish the stator, such steps can be avoided in practicing the present invention. More particularly, the magnetic segments 85 are preferably relatively strong magnets such as samarium cobalt. Since the internal diameter of the stator must be honed prior to insertion of the rotor, it will be appreciated that magnetic debris is generated as the magnetic segments are honed. This debris is highly magnetic and tends to adhere to the laminations and the like and, in the past, was very difficult to remove.

In practicing the present invention, the potting material is allowed to enter the internal bore (by means such as the aforementioned potting arbor) and thus entirely encompasses the magnetic segments 85. A completely smooth bore is provided which remains smooth as it is lapped or honed. Thus, even though highly adherent magnet debris is generated in the honing operation, since the internal bore 33 is completely smooth, it is a relatively easy matter to mechanically clean the bore with an appropriately sized cleaning tool and solvent or a high pressure wash to reliably remove even the most adherent magnetic particles, and provide a clean and unobstructed bore in which the rotor can rotate. In addition, the windings are completely potted so there is no danger of shorting from machining debris and also the electrical terminations for the windings are potted to produce a completely sealed unit which the machining debris never enters.

FIGS. 12 and 13 illustrate a further benefit of the potting and subsequent honing procedure when used with motors of the enhanced type. It is recalled that the inner diameter of the bearing surfaces at the end caps before honing is slightly smaller than the inner diameter of the stator lamination stack, and that potting with a straight arbor such as the aforementioned silicone rubber potting arbor assures a thin (such as 0.005") runner of potting material covers all of the teeth. In view of the fact that potting is accomplished from the bottom up and therefore reasonable pressure is generated during the potting operation, it will be appreciated that potting material is forced into any crevice in the inter-tooth gaps, serving as a bonding agent to hold the enhancement magnets in place. Subsequent lapping of the potted stator produces a smooth bore in which the stator teeth and magnets are exposed, potting material also forms a part of that smooth bore and assures the holding of the enhancement magnets in place in the inter-tooth gaps.

The potting material between the teeth also serves an important purpose for non-enhanced motors. In most machining operations, including the preferred diamond lapping operation, material is removed from the stator teeth by a tool which is constantly moving in the same direction, often at a relatively high rate. It is noted that using the preferred diamond lapping technique, it is preferred to utilize a tool speed of about 650 rpm and an advance rate of about 20" per minute. With no backing material between the teeth, particularly with high speed cutting, the shearing effect of the tool against the unsupported tooth would tend to distort the tooth trailing edges as material is sheared from the tooth face. Potting of the stator in such a way that all of the inter-tooth gaps are filled prior to machining puts a layer of backing material in the form of the potting material between the teeth such that as the tool removes material from the tooth it is supported by the backing material in the gap and does not distort or shear in such a way as to deform the edge as the tooth is machined. The result is very sharp edges on the teeth substantially free of distortion, and such sharp teeth contribute to the uniformity of magnetic paths through the motor.

FIGS. 12 and 13 also illustrate the thin runner of material formed over the stator teeth during the potting operation and later machined away. More particularly, referring to FIG. 12, it is seen that potting material completely fills the inter-tooth gap including all interstices between the magnets 85 and the teeth 67, covering all of the magnets and teeth to form a thin layer of potting material comprising a continuous surface throughout the bore of the motor. FIG. 12 illustrates the motor after potting, after removal of the arbor, and prior to lapping of the bore. FIG. 13 illustrates the condition after the bore is lapped showing a continuous surface for the internal bore, such continuous surface at different parts including the potting material, exposed teeth 67 and exposed magnets 85 (when present).

It will thus be appreciated that what has been provided is a new and reliably assembled electrical motor in which the stator is assembled from substantially unmachined parts. After a lamination stack is assembled, insulated, wound and terminated, a pair of unmachined end caps are disposed at either end of the lamination stack and initially secured in register to form a unitary assembly. The preferred forms of securing initial register are by through bolts or quick cure adhesive. Once the assembly is unitized, it is then potted, permanently locking in the register which had been initially secured. Having thus potted the entire stator assembly, the internal bore is then lapped to produce a straight, smooth uninterrupted internal bore which forms bearing surfaces in the end caps and the bore through the lamination stack for receiving the rotor. A previously assembled rotor assembly including a ground lamination stack of a given outer diameter and assembled bearings of slightly larger outer diameter is then inserted into the smooth bore of the stator assembly, secured in place, and the motor, after magnetization of the rotor, is ready for service.

What is claimed is:

1. An encapsulated stator electrical motor comprising, in combination:

a rotor assembly having a plurality of rotor laminations fixed in a stack on a rotor shaft, rotor bearings on the rotor shaft at either end of the rotor lamination stack, the outer diameter of the bearings being slightly greater than the outer diameter of the rotor lamination stack;

a unitary potted stator assembly including a stator lamination stack with exterior exposed and stator end caps on either end of the stator lamination stack;

a continuous bore formed in the stator assembly through a first one of the end caps, through the stator lamination stack and through a second one of the stator end caps, the bore forming an internal cylindrical area for receipt of the rotor lamination stack and bearing surfaces in the end caps, the bore comprising a smoothly machined surface free of discontinuities capable of trapping machining debris formed during machining of the bore, the smoothly machined surface of the bore exposing portions of the end caps, the stator lamination stack and interposed potting material; and the rotor assembly being carried within the bore formed in the stator assembly with the rotor bearings engaging the bearing surfaces in the end caps leaving an air gap between the rotor lamination stack and the stator lamination stack.

2. The motor of claim 1 including clearance holes in the stator lamination stack and at least one of the end caps, bolts passing through said clearance holes for joining the end caps and stator lamination stack, and potting material in the end caps and lamination stack for fixing the position of the lamination stack and end caps with respect to each other.

3. The motor of claim 1 in which the stator lamination stack includes a plurality of stator poles, each pole having a plurality of stator teeth, the continuous bore through the stator lamination stack comprising exposed stator teeth separated by potting material in gaps between the stator teeth and gaps between the stator poles.

4. The motor of claim 3 including windings on the stator poles, electrical connections for the windings, and potting material encapsulating said windings and electrical connections.

5. The motor of claim 3 further including an electrical connector connected to the windings and located in one of the end caps, and sealing means between the connector and at least the associated end cap for preventing leakage of potting material in the area of the connector.

6. The motor of claim 5 further including a mating connector for making connections to an external drive circuit, and jumper means on the mating connector for adjusting the number of poles of the motor to conform to the number of poles of the drive circuit.

7. The motor of claim 4, further including a plurality of permanent magnets disposed between stator teeth on the stator poles, and potting material assisting in retaining the permanent magnets in place between the stator teeth, the potting material and magnets forming portions of said smoothly machined surface free of discontinuities such that machining debris attracted to the permanent magnets is exposed for removal from said continuous bore.

8. The motor of claim 1 in which the continuous bore comprises exposed bearing supporting surfaces machined in the end caps, exposed stator teeth and exposed permanent magnets machined in the stator lamination stack, and potting material interposed between and forming a continuous bore with said exposed elements.

9. The motor of claim 1 in which the electrical motor is a hybrid permanent magnet stepping motor, the rotor assembly having at least two stacks of toothed rotor laminations separated by a permanent magnet, the teeth of the respective rotor lamination stacks being offset from each other.

10. The motor of claim 1 in which the unitary potted stator assembly includes a plurality of poles separated by inter-pole gaps, potting material within the stator assembly in the shape of a pair of ring-like donuts in the end caps joined by fingers in the stator gaps.

* * * * *